US010770953B2

(12) United States Patent
Marvin (10) Patent No.: US 10,770,953 B2
(45) Date of Patent: Sep. 8, 2020

(54) LIQUID COOLED STATOR FOR HIGH EFFICIENCY MACHINE

(71) Applicant: LCDrives Corp., Goshen, CT (US)

(72) Inventor: Russel Hugh Marvin, Goshen, CT (US)

(73) Assignee: LCDRIVES CORP., Goshen, CT (US)

( * ) Notice: Subject to any disclaimer, the term of this patent is extended or adjusted under 35 U.S.C. 154(b) by 0 days.

(21) Appl. No.: 13/855,801

(22) Filed: Apr. 3, 2013

(65) Prior Publication Data

US 2014/0300220 A1 Oct. 9, 2014

(51) Int. Cl.
*H02K 9/19* (2006.01)
*H02K 3/24* (2006.01)

(52) U.S. Cl.
CPC ............ *H02K 9/19* (2013.01); *H02K 3/24* (2013.01); *Y10T 29/49009* (2015.01)

(58) Field of Classification Search
CPC .. H02K 9/19; H02K 5/20; H02K 3/22; H02K 1/06; H02K 1/16; H02K 1/185; H02K 9/28; H02K 5/148; H02K 3/24; H02K 1/148; H01R 39/08
USPC ..... 310/54, 52, 57, 216.119, 227, 16, 12.29, 310/60 A
See application file for complete search history.

(56) References Cited

U.S. PATENT DOCUMENTS

| 2,695,368 A | * | 11/1954 | Kilbourne | ................ H02K 3/22 310/64 |
| 2,897,382 A | * | 7/1959 | Hamill | .................... H02K 3/22 310/54 |
| 2,975,088 A | * | 3/1961 | Rossman | ................ H01B 3/46 310/208 |

(Continued)

FOREIGN PATENT DOCUMENTS

| EP | 2 182 570 A1 | 5/2010 |
| JP | 6035929 | 2/1985 |

(Continued)

OTHER PUBLICATIONS

Machine translation for JP 2005168265.*

(Continued)

*Primary Examiner* — Tulsidas C Patel
*Assistant Examiner* — Ahmed Elnakib
(74) *Attorney, Agent, or Firm* — Tarolli, Sundheim, Covell & Tummino LLP (57) ABSTRACT

A rotary electric machine includes a stator having a circumferentially spaced series of axially extending teeth defining winding slots therebetween. Stator windings are at least partially disposed in each winding slot and electrically connected to form a plurality of phases. One or more slots contain the same magnitude of current at substantially all times for each phase. Structure defines a plurality of elongated coolant passageways disposed in each winding slot. A subset of the coolant passageways contained in the slots for a single phase is an even number. Fluid flows in one (Continued)

direction for half of the subset of coolant passageways and in the opposite direction for the other half of the subset of coolant passageways. At least two of the coolant passageways in the machine are fluidly connected in parallel. At least one of the coolant passageways is located circumferentially between two windings in the same slot.

29 Claims, 9 Drawing Sheets

(56) References Cited

U.S. PATENT DOCUMENTS

| | | | | |
|---|---|---|---|---|
| 3,089,048 A * | 5/1963 | Bahn | ....................... | H02K 3/505 310/231 |
| 3,435,262 A * | 3/1969 | Bennett | .................... | H02K 1/20 174/DIG. 20 |
| 3,459,979 A * | 8/1969 | Carew | ....................... | H02K 3/20 310/183 |
| 3,801,843 A * | 4/1974 | Corman | ............. | F28D 15/0275 165/104.25 |
| 4,404,486 A * | 9/1983 | Keim | ....................... | H02K 3/28 310/198 |
| 4,446,393 A * | 5/1984 | Finegold | .................. | H02K 3/18 310/184 |
| 5,140,204 A * | 8/1992 | Cashmore | ................ | H02K 9/20 310/214 |
| 5,473,207 A * | 12/1995 | Hopeck | .................... | H02K 9/19 310/54 |
| 5,866,965 A * | 2/1999 | Baronosky | ............... | H02K 3/18 310/208 |
| 5,973,427 A * | 10/1999 | Suzuki | ..................... | H02K 9/19 310/52 |
| 6,216,513 B1 * | 4/2001 | Nakamura | ............. | B21B 1/166 29/605 |
| 6,304,011 B1 * | 10/2001 | Pullen | ..................... | H02K 1/20 310/52 |
| 6,313,556 B1 | 11/2001 | Dombrovski et al. | | |
| 6,509,665 B1 * | 1/2003 | Nishiyama | ............... | H02K 9/22 310/194 |
| 7,569,955 B2 * | 8/2009 | Hassett | ............... | F28D 15/0275 310/52 |
| 7,698,803 B2 * | 4/2010 | Mitsui | .................... | H02K 1/148 29/596 |
| 2002/0117936 A1 | 8/2002 | Dressel | | |
| 2002/0140312 A1 | 10/2002 | Ikeda et al. | | |
| 2002/0163275 A1 * | 11/2002 | Hsu | ......................... | H02K 3/18 310/194 |
| 2002/0167232 A1 * | 11/2002 | Randall | ........................... | 310/54 |
| 2002/0180284 A1 * | 12/2002 | Leflem | .................... | H02K 3/47 310/54 |
| 2003/0048031 A1 * | 3/2003 | Dunlap | .................... | H02K 9/19 310/254.1 |
| 2004/0100154 A1 * | 5/2004 | Rahman | .................. | H02K 3/24 310/54 |
| 2005/0269895 A1 * | 12/2005 | Innami | ................ | B62D 5/0403 310/429 |
| 2006/0043801 A1 * | 3/2006 | Adra | ........................ | H02K 3/24 310/54 |
| 2007/0278879 A1 | 12/2007 | Kaminski et al. | | |
| 2008/0023177 A1 * | 1/2008 | Hassett | .................... | H02K 9/20 165/104.33 |
| 2008/0197724 A1 * | 8/2008 | Cullen | .................. | H02K 9/005 310/53 |
| 2010/0102651 A1 * | 4/2010 | Mohle et al. | ................... | 310/54 |
| 2011/0092371 A1 * | 4/2011 | Lee | ........................ | H02K 9/193 505/150 |
| 2011/0133580 A1 * | 6/2011 | Sugimoto | ................ | H02K 1/20 310/54 |
| 2011/0309695 A1 * | 12/2011 | Huard | ..................... | H02K 3/24 310/46 |
| 2014/0139057 A1 * | 5/2014 | Ho | ......................... | H02K 1/148 310/54 |

FOREIGN PATENT DOCUMENTS

| | | |
|---|---|---|
| JP | 11252842 | 9/1999 |
| JP | 2005-168265 * | 6/2005 |
| JP | 2005168265 * | 6/2005 |
| WO | 00/01053 | 1/2000 |

OTHER PUBLICATIONS

English translation of JP2005168265; Jun. 2005; Yuki et al.*
English translation of JP 54050805; Apr. 1979; Inohara.*
PCT/US2014/032369 International Search Report and Written Opinion, completed Jul. 21, 2014.

* cited by examiner

LIQUID COOLED STATOR FOR HIGH EFFICIENCY MACHINE

BACKGROUND OF THE INVENTION

Stators for rotary electric machines including electric motors, generators, and the like have employed various types of cooling including air, liquid and two phase cooling. Air blown through the center of the machine had traditionally been the standard with liquid becoming more common in high power applications. Two phase cooling has not developed into a mainstream due to cost and complexity. Liquid cooling is preferred for many high power applications because it generates a more compact design and is compatible with a sealed housing construction which is preferable in many environments.

The most common liquid cooling design uses a cooling jacket wrapped around the outside of the stator assembly. This can be seen in U.S. Pat. No. 5,448,118 entitled LIQUID COOLED MOTOR AND ITS JACKET, included herein by reference. In this design there is an aluminum extrusion that surrounds the outside of the stator and has passages for cooling fluid to pass through. This design cools the stator better than air, but is limited by i) the conductivity between the jacket and the stator, ii) the poor conductivity of the stator laminations, iii) the conductivity of the slot liners, and iv) the poor conductivity between the winding and the slot liners.

Another method that is commonly used is passing cooling fluid through the stator laminations or into slots cut into the stator laminations. Either of these has similar but not as severe disadvantages to the cooling jacket design. Additionally, it typically requires the stator to get larger to accommodate the holes in the magnetic material.

Further, some techniques involve spraying fluid directly on the stator or submerging the stator. These have the disadvantage of either being overly complex or having the fluid cause drag between the rotor and the stator.

There are at least two techniques placing the cooling manifold through the winding slot. One of these is forcing fluid down the center of a conductor. Typically the fluid in this case is a non-conductive oil. This has the disadvantage of requiring a special fluid and some complex manufacturing methods to provide the fluid channel. For extremely high powers in the 10 MW and above range the cooling media is often hydrogen. Other techniques place a pipe or vessel down through the slot with cooling fluid in it. These typically also use non-conductive oil and have non-conductive connections to a manifold at their end. An example of this can be found in U.S. Pat. No. 3,112,415 entitled CONTROL OF WINDING TEMPERATURES OF LIQUID COOLED GENERATORS, incorporated herein by reference.

This design integrates the cooling manifold into the stator slot directly adjacent to the wires that generate the heat. This accommodates use of standard ethylene glycol coolant which is highly desired in the industry, and achieves very compact machines.

Novel methods of cooling by the same inventor are also shown in other applications filed by Marvin et al U.S. patent application Ser. No. 13/548,199 entitled LIQUID COOLED HIGH EFFICIENCY PERMANENT MAGNET MACHINE WITH GLYCOL COOLING, Ser. No. 13/548,203 entitled LIQUID COOLED HIGH EFFICIENCY PERMANENT MAGNET MACHINE WITH IN SLOT GLYCOL COOLING, Ser. No. 13/548,207 entitled HIGH EFFICIENCY PERMANENT MAGNET MACHINE WITH CONCENTRATED WINDING AND DOUBLE COILS, and Ser. No. 13/548,208 entitled HIGH EFFICIENCY PERMANENT MAGNET MACHINE WITH LAYER FORM WINDING all filed Jul. 13, 2012, all incorporated herein by reference.

The most common stator winding type is a distributed winding. One type of which is an integer-slot winding wherein the number of slots per pole per phase is an integer. An example of this is a 4 pole 12 slot, 3 phase motor. The number of slots per pole per phase is 1 and therefore an integer. These windings typically require some relatively complex end turns to wire them properly. One type of construction is a diamond form winding that is used in many of the larger, higher voltage, and more reliable machines.

Another type of winding is a concentrated winding when the number of slots per pole per phase is a fraction less than one. These can also be called a non-overlapping concentrated winding. They have the disadvantage of decreasing the inherent efficiency of the device, but make the end turns very simple and can facilitate other advantages. An example of a concentrated winding would be an 8 pole, 9 slot, 3 phase machine. The number of slots per pole per phase is 0.375 in this case. The fundamental power from this configuration is reduced by 5.5%. Concentrated windings can be single layer or double layer designs. Single layer designs have windings that are wound only on alternating stator teeth and only apply where there is an even number of stator slots/teeth. Double layer designs have coils wound on every stator tooth. In this configuration, there is a coil that surrounds each of the teeth on the stator and there are the same number of coils as slots. Further, each slot has half of one coil and half of another coil going through the slot and the end turns are very short. Ideally, the end turns can be as short as the width of the stator tooth.

Double layer concentrated windings have the advantage of being a simple coil wrapped around each tooth. For an external rotor configuration, and using relatively open slots, this allows simple assembly of coils. For the more typical internal rotor configuration, assembly is a bit trickier because even with relatively open slots, the opening is smaller than the slot. This is further complicated if the slot opening is made smaller for motor performance reasons. A typical method of mitigating this issue is to make the teeth separate to either be able to 1) wind the wire directly on the tooth or 2) slide the winding on from the outside. The first method is shown in U.S. Pat. No. 5,583,387 entitled STATOR OF DYNAMO-ELECTRIC MACHINE incorporated herein by reference. The second method is shown in U.S. Pat. No. 4,712,035 entitled SALIENT POLE CORE AND SALIENT POLE ELECTRONICALLY COMMUTATED MOTOR also incorporated herein by reference although it is shown as an external rotor configuration. Both methods are shown as conventional in U.S. Pat. No. 8,129,880 entitled CONCENTRATED WINDING MACHINE WITH MAGNETIC SLOT WEDGES, incorporated herein by reference. The challenge with any stator lamination design that has separate teeth is to secure the teeth structurally so they do not move or break. Even small movements of the teeth can cause acoustic noise. A second challenge is to configure the joint in such a way to not significantly disturb the magnetic flux traveling through the laminations. If the joint could be made with zero clearance this would not be a problem, but with real manufacturing tolerances and features required for attachment, this is a major consideration.

Rotary electric machines including electric motors, generators, and the like have employed various methods of constructing stator windings. Some methods are applicable to only certain types of stator windings.

One common method is random winding. This method can use rectangular or round wire, but typically uses round wire. Here the windings are placed by the winding machine with the only requirement that they be located in the correct slot. This is the easiest method of stator winding, but results in the lowest amount of conductor in the slot and therefore the lowest efficiency. This method can be used with any type of stator winding including concentrated windings.

Another common method is diamond form winding. This method typically uses rectangular wire with various tapes located between conductors to separate any conductors that are significantly different in voltage and the shape of the coil is in a diamond shape. This is a robust winding for higher voltage machines or machines that are prone to partial discharge. This is typically the most labor-intensive type of winding due to the manufacture of the coils and the insertion time to put these coils in the machine from the inside. This labor time can be improved by insertion from the outside which is one of the objects of the design disclosed in this patent.

One winding type that is not typical in motors, is used in certain types of transformers, chokes, and inductors is bobbin layer winding. This type of winding places conductors in exact locations for very accurate stacking of wires. This can achieve a high amount of conductors in a small area for high efficiency. This is not typically used for distributed windings because you are not able to bobbin wind a coil and then insert it into a stator assembly. This is possible with concentrated windings that have removable teeth. The most common wire to use is round wire but it is possible to use square or rectangular wire. Layer winding with rectangular wire is typically laid flat and wound the easy way. This facilitates simpler winding, but one disadvantage of this is the eddy current losses due to slot leakage can be significantly higher. Also, orientation of the rectangular wire can have an impact on thermal performance and depends on the overall heat removal scheme.

Layer winding with rectangular wire can be done edge wound (wound the hard way.) This is shown in U.S. Pat. No. 4,446,393 entitled DYNAMOELECTRIC FIELD ASSEMBLY AND WINDING THEREFOR incorporated herein by reference. In this patent a single layer of rectangular wire is used in each slot and is edge wound. This patent used removable teeth and an internal rotor. U.S. patent application serial number 2010/0066198 filed Mar. 18, 2010 entitled INSERTION OF PRE-FABRICATED CONCENTRATED WINDINGS INTO STATOR SLOTS incorporated herein by reference also shows a single layer of rectangular wire but does not use removable teeth. Edge wound coils can have significantly lower eddy current losses in the wires. The cooling may be better or worse depending on the overall cooling scheme.

SUMMARY OF THE INVENTION

The machine described herein incorporates several novel construction methods in its stator. The key is different approaches to accommodate liquid cooling in the slot in an economical efficient approach.

The preferred design uses either Edge Form Wound Windings for concentrated wound machines or Diamond Form Wound Windings for distributed wound machines. The preferred approach places the cooling manifold in the center of the slot between two sets of windings. In certain applications it makes sense to put at least some of the cooling manifold in different locations in the slot. This general approach insures a very good thermal solution that allows much higher current density in the slot. Higher current density in the slot allows significantly higher overall torque density of the rotating machine. The machine described herein also allows the use of conductive fluid such as ethylene glycol.

This configuration uses metallic vessels that contain the liquid cooling medium for high reliability. These metallic vessels are brazed together into manifolds to efficiently direct the liquid to where the heat is generated. The specific geometry and connectivity of the cooling manifolds allows this to be done without detrimental effects to the performance of the machine.

The overall approach leads to a very reliable, compact, efficient, and low cost design.

DESCRIPTION OF PREFERRED EMBODIMENT

Figure 1:
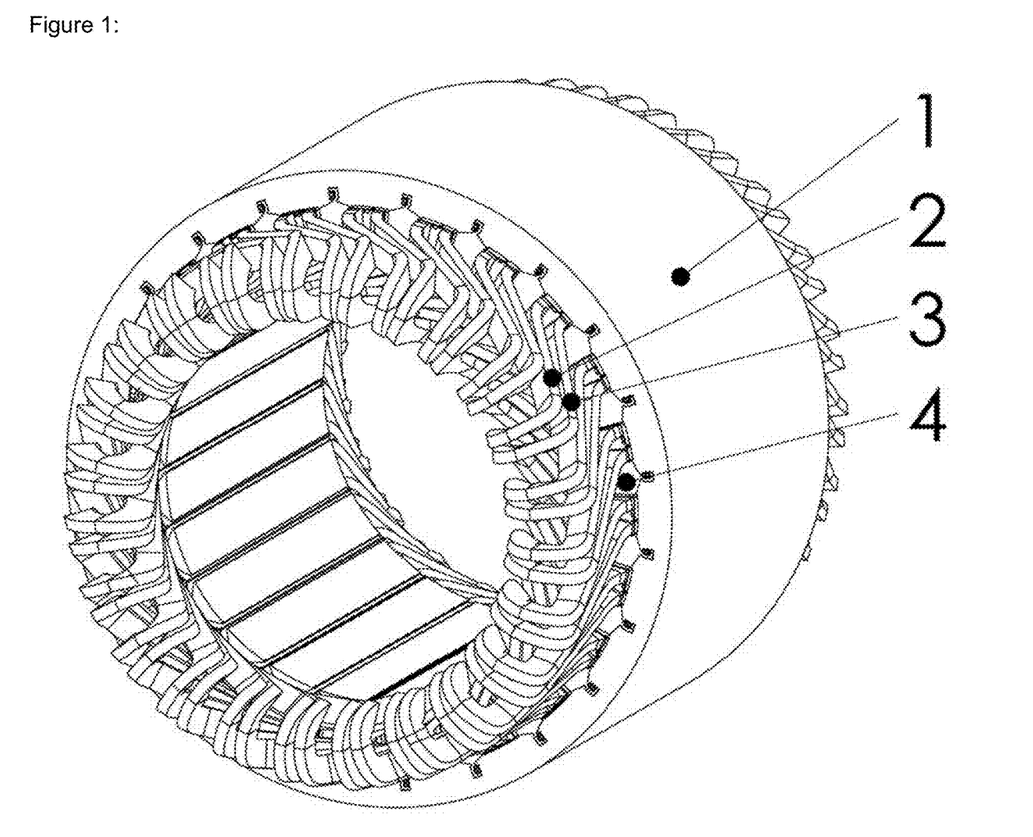
FIG. 1 is a three dimensional view of the stator assembly for a distributed wound machine.
Figure 2:
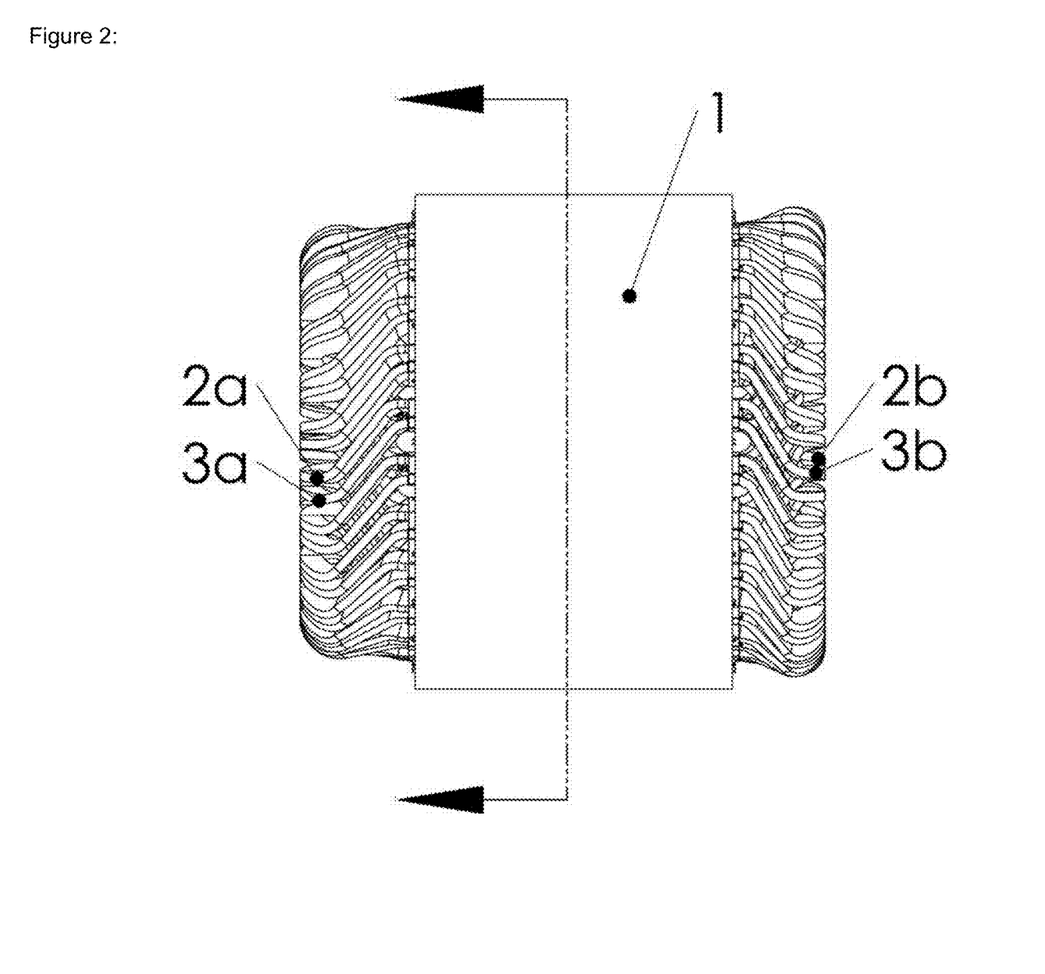
FIG. 2 is a side view of the stator assembly of FIG. 1.
Figure 3:
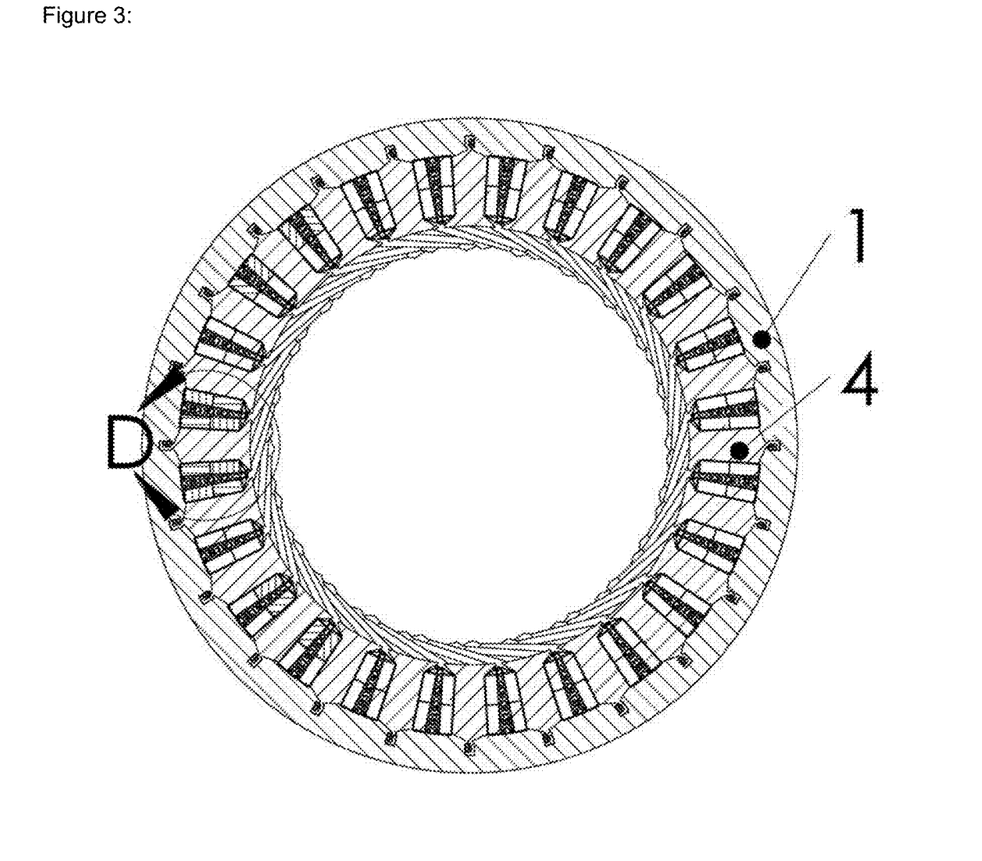
FIG. 3 is a sectional view of the stator assembly shown in FIG. 1 and FIG. 2.

Referring particularly to FIG. 1, a distributed wound stator assembly is shown containing stator yoke 1, stator coil 2, stator coil 3, and stator lamination teeth 4. There are two different stator coils 2,3 shown due to the fact that they are not evenly spaced and therefore are of slightly different shape. In order to accommodate assembly of the machine the coils 2,3 are bent inward on at least one end as shown in FIG. 2 where coil ends 2a,3a are bent inward and coil ends 2b,3b are bent in a more conventional configuration. The joint between the stator teeth 4 and stator yoke 1 can be seen clearly in FIG. 3.

Figure 4:
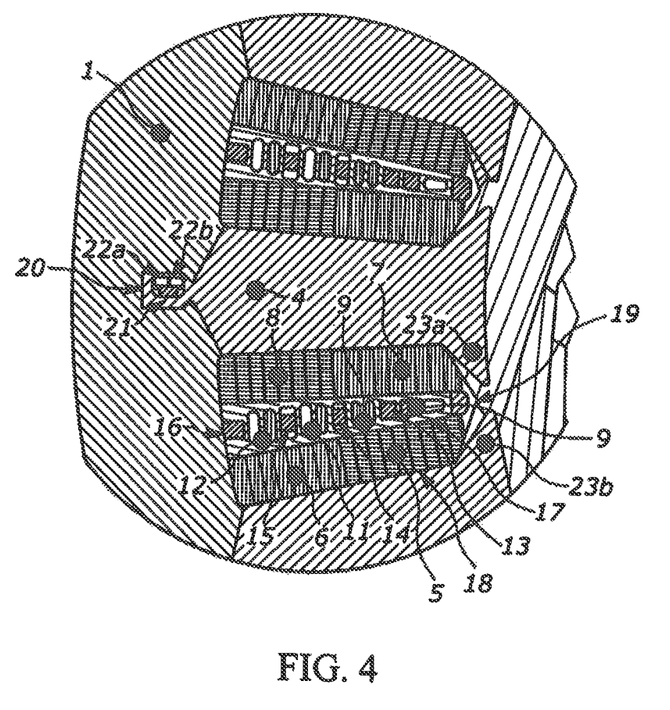
FIG. 4 is an enlarged detail sectional view of the stator assembly shown in FIG. 3.
Figure 8:
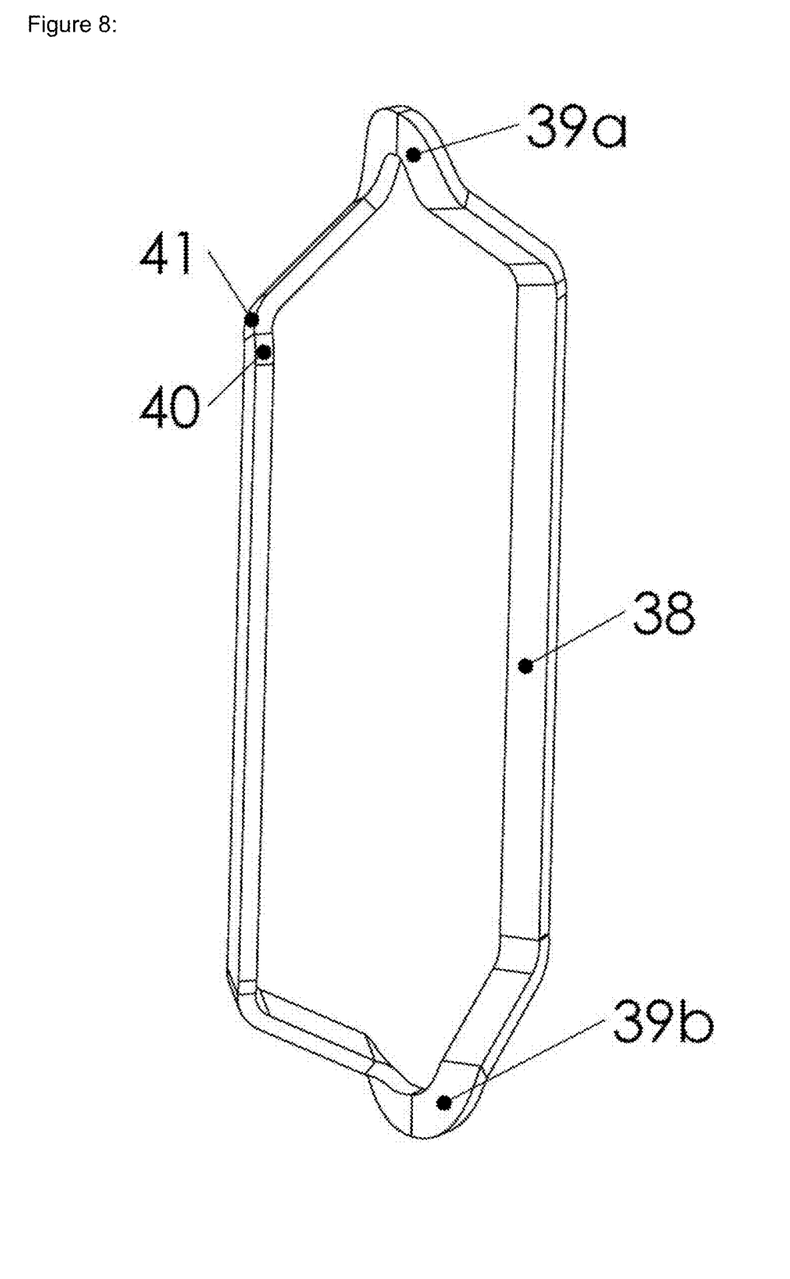
FIG. 8 is a three dimensional view of a diamond coil.

In the cross section view of FIG. 4, the coil bundles can be seen as 5,6,7, and 8. Each of these coil bundles can be made up of anywhere from a single turn to many turns. The wire is rectangular in shape with the wide dimension on the wire being in the circumaxial direction of the machine. This is the same direction as the narrow dimension on the coil bundle as shown in FIG. 4. This can be accomplished by forming the coils in a diamond shape as shown in FIG. 8. This diamond shape coil has straight sections 38, pin turns 39a and 39b, bends in the easy way 40 and bends in the hard way 41.

As shown in FIG. 4, the cooling manifold in each slot consist of 4 cooling bars 9,10,11, and 12 which are manufactured by aluminum extrusion and therefore electrically conductive. Aluminum s used for ease of manufacturing and the attachment to the slot manifold can be done using a brazing process. Preferably cooling goes down in one slot and up in the other slot in that same cooling bar. The cooling bars are separated by insulator 13, 14, 15, and 16 made of a solid insulator such as Polyphenylene sulfide (PPS). There is also a slot liner 19 that wraps the entire way around the slot with overlap that is made of NOMEX® or similar. Located between cooling bars 9,10,11,12 and coil bundles 5,6 is an insulator 17 that is preferably a thermally conductive electrically insulative material. Further, this material preferably is made of a compressible material to accomplish good thermal contact between the cooling bars and the coil bundles. One material that fits this need is filled Silicon rubber gap filler pads sold by Parker Chomerics and others. If additional compliance is needed to absorb tolerance, a compressible pad 18 can be placed between coil bundles 5,6 and slot liner 19 or alternatively between slot liner 19 and tooth 4.

To accommodate the tooth tips 23 *a*, 23 *b* being located close together and to accommodate the easy insertion of coils, the stator teeth 4 are made a separate part from stator yoke 1 so the coils and cooing manifold can be assembled from the outside diameter. The tooth attachment scheme shown consists of a narrow cantilever beam 20 located on the tooth that is pulled radially outward using wedges 22 *a* and 22 *b* that are electrically insulated from the stator by insulator 21.

It is unusual for a distributed wound stator assembly to have separable teeth. Typically windings are inserted from the inside through wide tooth tip gaps. The preferred assembly approach for this distributed wound stator is to place the teeth 4, windings 4,5,6,7, cooling manifolds 9,10,11,12, and various insulators 17,18,19 into an assembly fixture. This assembly would take place at a slightly larger diameter than final size to accommodate tolerances and assembly clearances. The fixture would then draw down the diameter to slightly smaller than the final diameter compressing the compressible members 17,18 in the slot. The stator yoke 1 is then inserted axially over the assembly. The fixture then allows the diameter to increase outwardly expanding the compressible members 17,18 in the slot. Now the wedges 22 and associated insulator 21 can be installed to draw the teeth 4 into final position. The assembly is now ready for vacuum pressure impregnation (VPI) with an epoxy resin.

Figure 9:
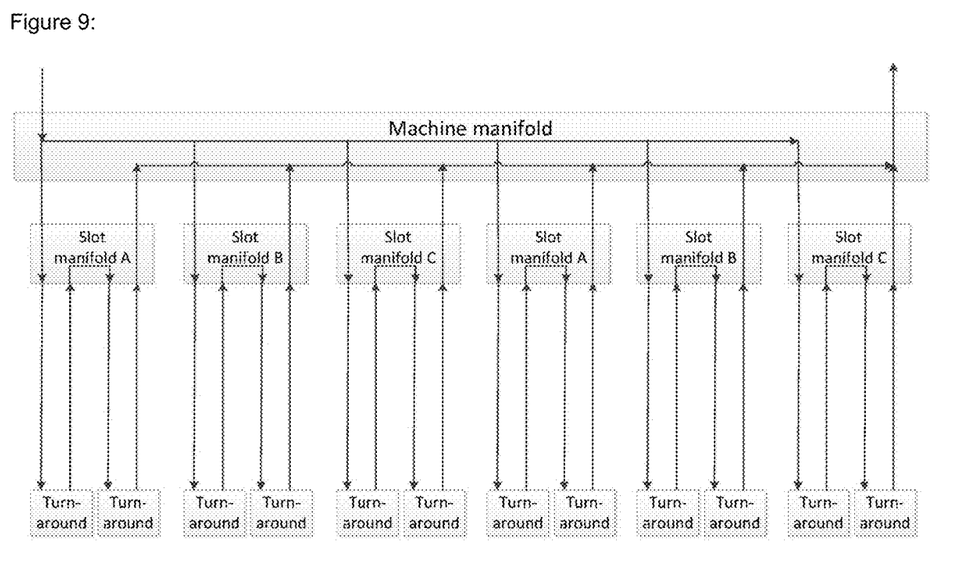
FIG. 9 is a fluid schematic of the cooling system.

FIG. 9 shows a fluid schematic for a 6 slot 3 phase machine where slot manifold A is located in phase A, slot manifold B is located in phase B, and slot manifold C is located in phase C. Each phase constitutes windings that all have the same current in each one. Multiple winding can be connected in series or parallel and still have substantially the same current in each one. In a three phase machine, phases are typically connected in either a wye or delta configuration which does not affect the design.

As shown in FIG. 9, there are two cooling bars for each slot each with its own turnaround. The diagram also shows the two cooling bars in each slot fluidically in series, but alternately they could be connected in parallel or partially parallel and series. This diagram shows each of the slot maniofolds fluidically in parallel, but alternately they could be connected in series or partially parallel and series. The schematic for stator in FIG. 3 would look much the same except there would be 12 slots and 4 cooling bars for each slot. FIG. 9 shows all fluid interconnections at one end. Alternately, some of the fluid connections can be made on the opposite end, but the number of passages flowing up in each phase must equal the number of passages flowing down in each phase. The media flowing in each of the coolant loops is preferably a 50% mixture of ethylene glycol and water so the liquid will not freeze at cold temperatures.

Figure 5:
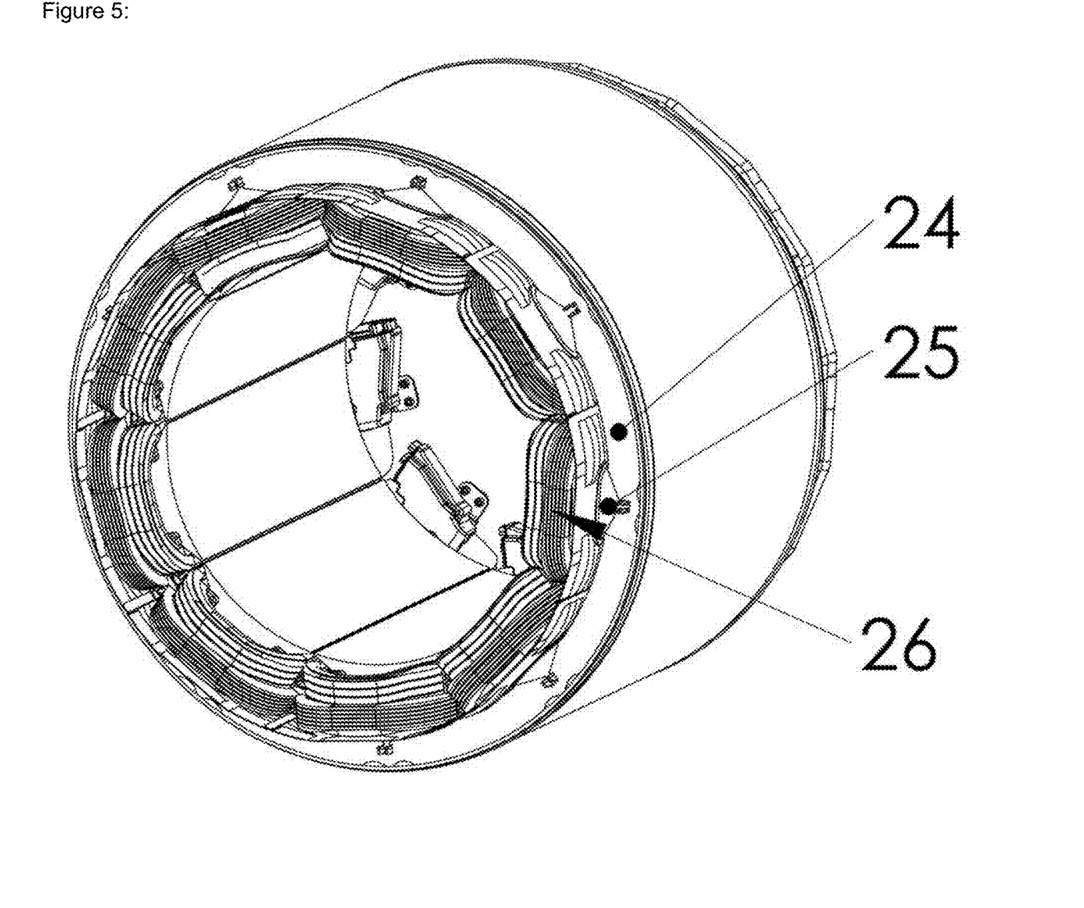
FIG. 5 is a three dimensional view of the stator assembly for a concentrated wound machine.
Figure 6:
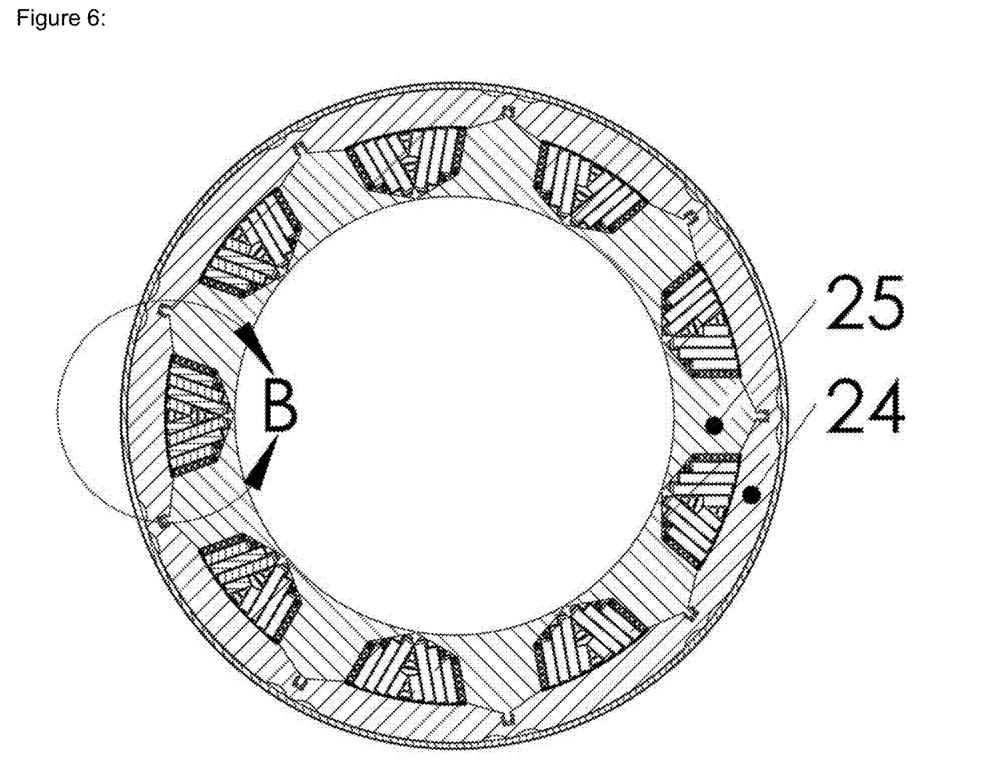
FIG. 6 is a cross sectional view of the stator assembly shown in FIG. 5.
Figure 7:
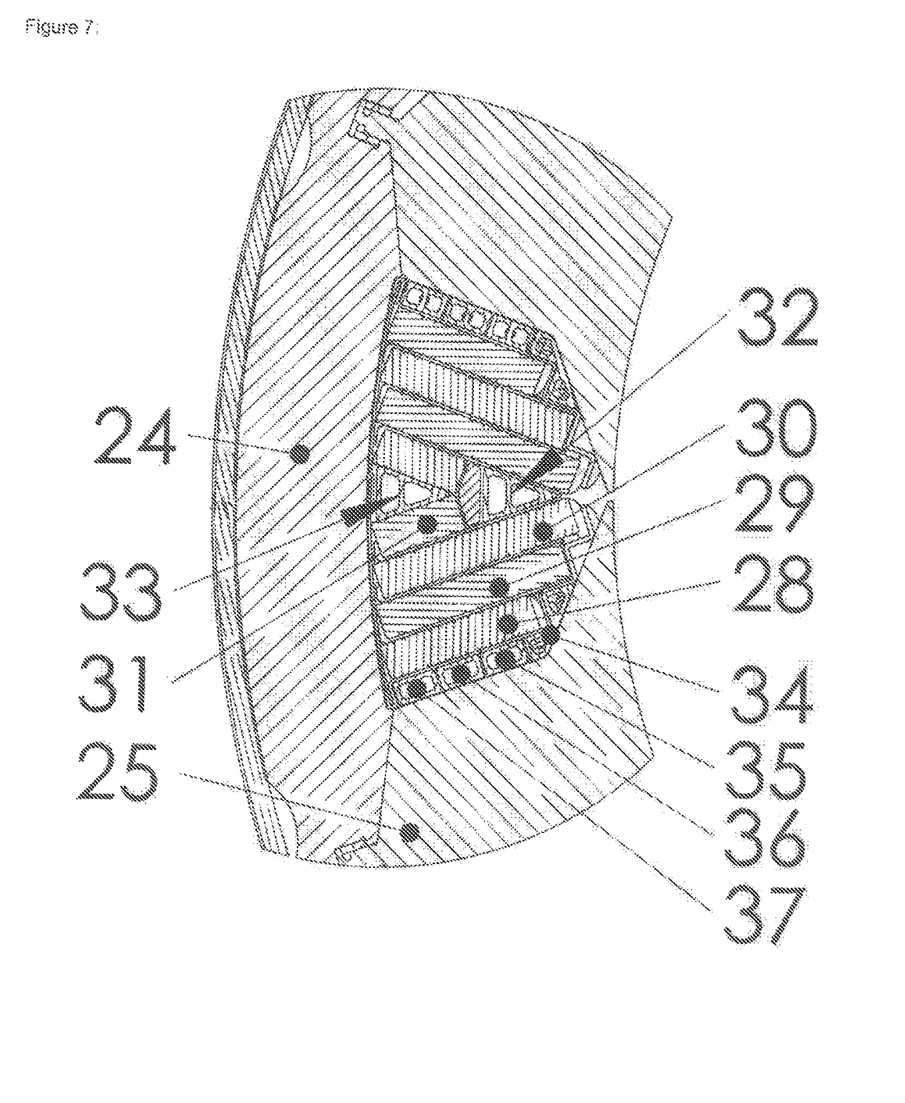
FIG. 7 is an enlarged detail sectional view of the stator assembly shown in FIG. 6.

An alternate configuration in FIG. 5 is shown as a three dimensional view of a concentrated wound stator. The stator yoke 24, stator teeth 25, and windings 26 accomplish this concentrated wound configuration, FIG. 6 shows a cross sectional view that better shows the stator yoke 24 and stator teeth 25. The cross sectional view of the windings is better shown in FIG. 7 where coil bundles 28, 29,30, 31 are shown that comprise a single winding. This configuration shows cooling bars 32 and 33 located in the middle of the slot between windings as well as cooling bars 34,35,36, 37 located between the tooth 25 and the windings. Alternate configurations could have only some of these cooling bars, have fewer or more coil bundles in each winding, or be a distributed wound solution. The wire is rectangular in shape with the wide dimension on the wire being in the circumaxial direction of the machine. This is the same direction as the narrow dimension on the coil bundle as shown in FIG. 7.

The invention claimed is:

1. A rotary electric machine comprising:
   a stator having a circumferentially spaced series of axially extending teeth defining a similar series of circumferentially spaced winding slots therebetween, said teeth being releasably connected to the stator;
   a plurality of stator windings at least partially disposed in each winding slot, said windings being electrically connected to form a plurality of phases wherein one or more slots contain the same magnitude of peak current for each phase;
   structure defining a plurality of elongated coolant passageways disposed in each winding slot and external to the windings;
   at least some of said coolant passageways being formed by a plurality of adjacent structures fluidly connected together at only one end of the machine;
   a compressible insulating layer extending between the structure and the windings in each slot and having an interface with only a portion of the periphery of each winding in the slot; and
   a resin extending around the insulating layers and formed from a material different from the material of the insulating layers.

2. A rotary electric machine as set forth in claim 1 wherein at least one of the coolant passageways is located circumferentially between two windings in the same slot.

3. A rotary electric machine as set forth in claim 1 wherein said coolant passageways are constructed of an electrically conductive material.

4. A rotary electric machine as set forth in claim 1 wherein said coolant passageways are attached to a manifold using a brazed connection.

5. A rotary electric machine as set forth in claim 1 wherein said slots each have the same number of coolant passageways extending in one direction as are extending in the opposite direction.

6. A rotary electric machine as set forth in claim 1 wherein at least one of said coolant passageways is located circumferentially between one of the windings and one of the teeth.

7. A rotary electric machine as set forth in claim 1 wherein at least two of the coolant passageways have different axial cross-sections from one another.

8. A rotary electric machine as set forth in claim 7 wherein the coolant passageways are radially aligned with one another and increase in size in the radially outward direction.

9. A rotary electric machine as set forth in claim 1 further comprising a manifold for fluidly connecting at least four coolant passageways within the same winding slot.

10. A rotary electric machine as set forth in claim 1, wherein the compressible insulating layer is formed from silicon rubber.

11. A rotary electric machine as set forth in claim 1, wherein the stator windings have a diamond shaped coil.

12. A rotary electric machine as set forth in claim 1, wherein the at least one stator winding comprises rectangular wire formed in multiple turns with each turn having a width extending in a radial direction of the stator and a thickness greater than the width extending circumferentially.

13. A rotary electric machine as set forth in claim 1, wherein each tooth includes a pair of tips extending circumferentially and helping to retain the structure defining the coolant passageways within the winding slot.

14. A rotary electric machine as set forth in claim 1, wherein retention features secure the teeth to an outside lamination of the stator and prevent inward radial movement of the teeth relative to the stator.

15. A rotary electric machine as set forth in claim 1, wherein the compressible insulating member is positioned substantially entirely within the winding slot.

16. A rotary electric machine as set forth in claim 1, wherein the space circumferentially between the structure and the windings is free of resin within the winding slot.

17. A rotary electric machine as set forth in claim 1, wherein each compressible insulating layer extends around and engages the respective structure in the winding slot.

18. A rotary electric machine comprising:
a stator having a circumferentially spaced series of axially extending teeth defining a similar series of circumferentially spaced winding slots therebetween, said teeth being releasably connected to the stator;
a plurality of stator windings at least partially disposed in each winding slot, the windings being electrically connected to form a plurality of phases, at least one stator winding comprising rectangular wire formed in multiple turns with each turn having a width extending in a radial direction of the stator and a thickness greater than the width extending circumferentially;
structure defining an even number of elongated coolant passageways disposed in at least one winding slot circumferentially between two windings in the winding slot with the width of the rectangular wire in the slot being adjacent the structure, fluid flowing in one direction for half of the coolant passageways and in the opposite direction for the other half of the coolant passageways; and
a compressible insulating layer extending between the structure and the windings in each slot and having an interface with only a portion of the periphery of each winding in the slot.

19. A rotary electric machine as set forth in claim 18 wherein electrical paths through the windings are different from the fluid flows paths through the coolant passageways.

20. A rotary electric machine as set forth in claim 18 wherein in each of a plurality of winding slots a turnaround is provided for fluidly connecting coolant passageways in the same slot and in which fluid flows in opposite directions.

21. A rotary electric machine as set forth in claim 18 further comprising a resin extending around the insulating layers and formed from a material different from the material of the insulating layers.

22. A rotary electric machine as set forth in claim 18, wherein the structure defining the coolant passageways is external to the windings.

23. A rotary electric machine as set forth in claim 18, wherein the stator windings have a diamond shaped coil.

24. A rotary electric machine as set forth in claim 18, wherein each tooth includes a pair of tips extending circumferentially and helping to retain the structure defining the coolant passageways within the winding slot.

25. A rotary electric machine as set forth in claim 18, wherein each turn of the rectangular wire in one of the windings is spaced the same distance from the cooling structure.

26. A rotary electric machine as set forth in claim 18, wherein each compressible insulating layer extends around and engages the respective structure in the winding slot.

27. A rotary electric machine comprising:
a stator having a circumferentially spaced series of axially extending teeth defining a similar series of circumferentially spaced winding slots therebetween, said teeth being releasably connected to the stator;
a plurality of stator windings at least partially disposed in each winding slot, said windings being electrically connected to form a plurality of phases with at least a portion of the winding slots having only one phase of windings therein, at least one of the stator windings comprising rectangular wire formed in multiple turns with each turn having a width extending in a radial direction of the stator and a thickness greater than the width extending circumferentially;
structure defining a plurality of elongated coolant passageways disposed in each winding slot;
a silicon rubber, compressible insulating layer wrapped around and engaging each structure; and
a resin extending around the insulating layers and formed from a material different from the material of the insulating layers, the space circumferentially between the structure and the windings being free of resin within the winding slot.

28. The rotary electric machine recited in claim 27, wherein the windings are distributed wound around the teeth.

29. A rotary electric machine comprising:
a stator having a circumferentially spaced series of axially extending teeth defining a similar series of circumferentially spaced winding slots therebetween, said teeth being releasably connected to the stator;
a plurality of stator windings at least partially disposed in each winding slot, said windings being electrically connected to form a plurality of phases wherein one or more slots contain the same magnitude of peak current for each phase;
structure defining a plurality of elongated coolant passageways disposed in each winding slot and external to the windings, wherein coolant passageways in winding slots in one of the plurality of phases are not fluidly connected in series with coolant passageways in winding slots in another of the plurality of phases; and
at least some of said coolant passageways being formed by a plurality of adjacent structures fluidly connected together at only one end of the machine.

* * * * *